United States Patent
Cameron

[19]

[11] Patent Number: 5,973,887
[45] Date of Patent: Oct. 26, 1999

[54] LOAD AND UNLOAD RAMP WITH INTEGRATED LATCH

[75] Inventor: T. J. Cameron, Corralitos, Calif.

[73] Assignee: Seagate Technology, Inc., Scotts Valley, Calif.

[21] Appl. No.: 08/975,787

[22] Filed: Nov. 21, 1997

Related U.S. Application Data

[60] Provisional application No. 60/031,911, Nov. 22, 1996.

[51] Int. Cl.⁶ ....................................................... G11B 5/54
[52] U.S. Cl. ............................................................. 360/105
[58] Field of Search ............................................... 360/105

[56] References Cited

U.S. PATENT DOCUMENTS

| | | | |
|---|---|---|---|
| 4,644,429 | 2/1987 | Boe | 360/105 |
| 5,189,575 | 2/1993 | Onooka | 360/105 |
| 5,585,980 | 12/1996 | Boutaghou | 360/105 |

*Primary Examiner*—A. J. Heinz
*Attorney, Agent, or Firm*—Edward P. Heller, III; Raghunath S. Minisandram

[57] ABSTRACT

A ramp loading and unloading system for the heads in a disc drive including an integrated latching mechanism for the disc drive actuator. The flexures that support the heads include ramp contact features which engage the ramps, and at least one of the ramp contact features includes a vertical latching face. At least one of the ramps includes a discontinuity forming a ramp latching face with which the vertical latching face of the ramp contact feature engages to latch the actuator. The ramp structure also includes a pivoting member which is rotated under influence of the actuator to allow the latching faces of the flexure and ramp structure to disengage.

1 Claim, 11 Drawing Sheets

LOAD AND UNLOAD RAMP WITH INTEGRATED LATCH

CROSS REFERENCE TO RELATED APPLICATIONS

This application claims the benefit of United States Provisional Application No. 60/031,911, filed Nov. 22, 1996.

FIELD OF THE INVENTION

This invention relates generally to the field of hard disc drive data storage devices, and more particularly, but not by way of limitation, to an improved ramp system for unloading the heads of a disc drive from engagement with the discs and an actuator latching mechanism for holding the actuator mechanism of the disc drive at a park position on the ramps in the absence of power.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

When power to the disc drive is lost, servo control of the current flow in the coil of the voice coil actuator is lost. In the absence of DC current flowing in the coil, the actuator is free to move in response to such things as mechanical shock, air movement within the disc drive or mechanical bias applied to the actuator by the printed circuit cable (pcc) used to carry signals to the coil and to and from the heads mounted on the actuator. Since a power loss also means that the spindle motor will also cease to rotate the discs, the air bearing supporting the heads also begins to deteriorate and contact will be made between the heads and the discs. Because of this, it is common practice in the industry to monitor input power to the disc drive, and, at the detection of power loss, to drive the actuator to a park position and latch it there until power to the disc drive is restored.

It is also well known to use the back electromotive force (BEMF) generated by the inertia of the spinning discs to generate the power to move the actuator to a park position, and the park position is typically selected to be at a location which places the heads closely adjacent the hub of the spindle motor. By parking the heads toward the inner diameter of the discs, the amount of power necessary to overcome the frictional drag of the heads on the discs at power-up is minimized.

An alternative approach to protecting the heads and discs in the event of a power loss to the disc drive is to utilize a ramping system closely adjacent the outer diameter of the discs to remove the heads from engagement with the discs. The actuator is parked with the heads supported by the ramps and latched in this position until power to the disc drive is restored. Upon reestablishment of power to the disc drive, the actuator is unlatched, and the heads are loaded back into engagement with the discs onto an established air bearing. In disc drives utilizing such ramp loading and unloading systems, the heads and discs should never come into direct contact.

The principal requirements of an actuator latch mechanism are that it hold the actuator at the park position in the presence of a defined maximum specified amount of mechanical shock during the time interval when power is not applied, and that the latching mechanism be capable of releasing the actuator once power has been reapplied to the disc drive and the spindle motor brought back up to operational speed. It is also desirable if the latching mechanism can be implemented with a minimal cost, both in mechanical and electronic components.

Many forms of latches to hold the actuator at the park position have been used and are disclosed in the art. These include magnetic latches, solenoid-activated latches, shape-memory metal latches and aerodynamically activated latches. For a representative review of several prior art actuator latches, the reader is directed to U.S. Pat. No. 5,612,842, issued Mar. 18, 1997, U.S. Pat. No. 5,581,424, issued Dec. 3, 1996, U.S. Pat. No. 5,555,146, issued Sep. 10, 1996, U.S. Pat. No. 5,365,389, issued Dec. 15, 1994, U.S. Pat. No. 5,361,182, issued Dec. 1, 1994, U.S. Pat. No. 5,313,354, issued May 17, 1994, U.S. Pat. No. 5,262,912, Dec. 16, 1993 and U.S. Pat. No. 5,231,556, issued Jul. 27, 1993, all assigned to the assignee of the present invention and all incorporated herein by reference.

In latching mechanisms used in association with ramps, it is also desirable that the unlatching of the actuator does not require any sudden large acceleration of the actuator, since no servo control of the actuator exists until after the heads are repositioned in cooperative engagement with the discs. It is well known in the industry that the heads must be loaded off the ramps and onto the air bearing above the discs at a relatively low speed, to ensure that the air bearing is not overcome, allowing the heads to contact the disc surfaces. Any such head/disc contact greatly increases the possibility of damage to the heads, the discs or both.

Clearly a need exists for a head loading and unloading ramp system which incorporates a simple latch mechanism for the actuator in a disc drive, which does not require expensive electronic control circuitry, which holds the actuator with sufficient force to withstand the maximum specified mechanical shock and which is easily released when power to the disc drive is restored.

SUMMARY OF THE INVENTION

The present invention is a ramp loading and unloading system for the heads in a disc drive that includes an integrated latching mechanism for the disc drive actuator. The flexures that support the heads include ramp contact features which engage the ramps, and at least one of the ramp contact features includes a vertical latching face. The ramps in the system include beveled portions that lift the heads vertically away from the disc surfaces as the heads are moved radially outward from the discs, and flat portions extending in parallel with the surfaces of the discs. At least one of the flat portions of one of the ramps includes a discontinuity forming a ramp latching face with which the vertical latching face of the flexure ramp contact feature engages to latch the actuator. Associated with the ramp having the latching face is a pivoting element which has a contact surface which is non-coplanar with the flat portion of the ramp in a first, or latched, quiescent position. The pivoting element also includes an unlatching contact feature at the outer end of its contact surface. Unlatching of the actuator is accomplished by driving the actuator first in an outward direction, moving the flexure ramp contact feature associated with the latching mechanism along the pivoting element contact surface and into contact with the unlatching contact feature. As the flexure ramp contact feature bears against the pivoting element unlatching contact feature, the pivoting element is rotated into a second, or unlatched, position with its contact surface substantially coplanar with the flat portion of the associated ramp. The actuator is then moved rapidly inward along the pivoting element contact surface until the flexure ramp contact feature is positioned inward of the latching face and in contact with the flat portion of the ramp. The pivoting element is allowed to return to its first quiescent latched position, enabling subsequent latching operations. From the flat portion of the ramps, the heads are moved back into engagement with the discs in a controlled manner.

It is an object of the invention to provide a ramp system for unloading the heads of a disc drive from engagement with the discs and loading the heads back into engagement with the discs and a latching mechanism to hold the actuator of the disc drive at a park position with the heads supported by the ramps.

It is another object of the invention to provide a latching mechanism which requires minimal additional electronic or electrical controls for latching or unlatching.

It is another object of the invention to provide a latching mechanism that engages and disengages under influence of the actuator power source.

These and other objects, features and advantages of the present invention can best be understood by a review of the following Detailed Description of the Invention, when read in conjunction with an examination of the accompanying drawings.

BRIEF DESCRIPTION OF DRAWINGS

FIG. 1-1 is a partial plan view showing an alternative flexure configuration useful with the present invention.

FIGS. 2-1 through FIG. 2-4 are simplified elevation views showing prior art ramp and actuator latching systems.

FIGS. 3-1 and 3-2 are perspective views of two configurations of ramp components that form a part of the present invention.

FIGS. 4-1 and 4-2 are detail perspective views of two alternative configurations of a flexure ramp contact feature that is a part of the present invention.

FIGS. 5-1 through 5-4 are simplified elevation views showing components of the ramp and latching system of the present invention and illustrating various latching and unlatching steps.

FIG. 5-3-1 is a detail view showing specific component relationships from FIG. 5-3.

FIGS. 6-1 and 6-2 are perspective views of two configurations of an alternative embodiment of the ramp and latching system of the present invention.

DETAILED DESCRIPTION OF THE INVENTION

Figure 1:
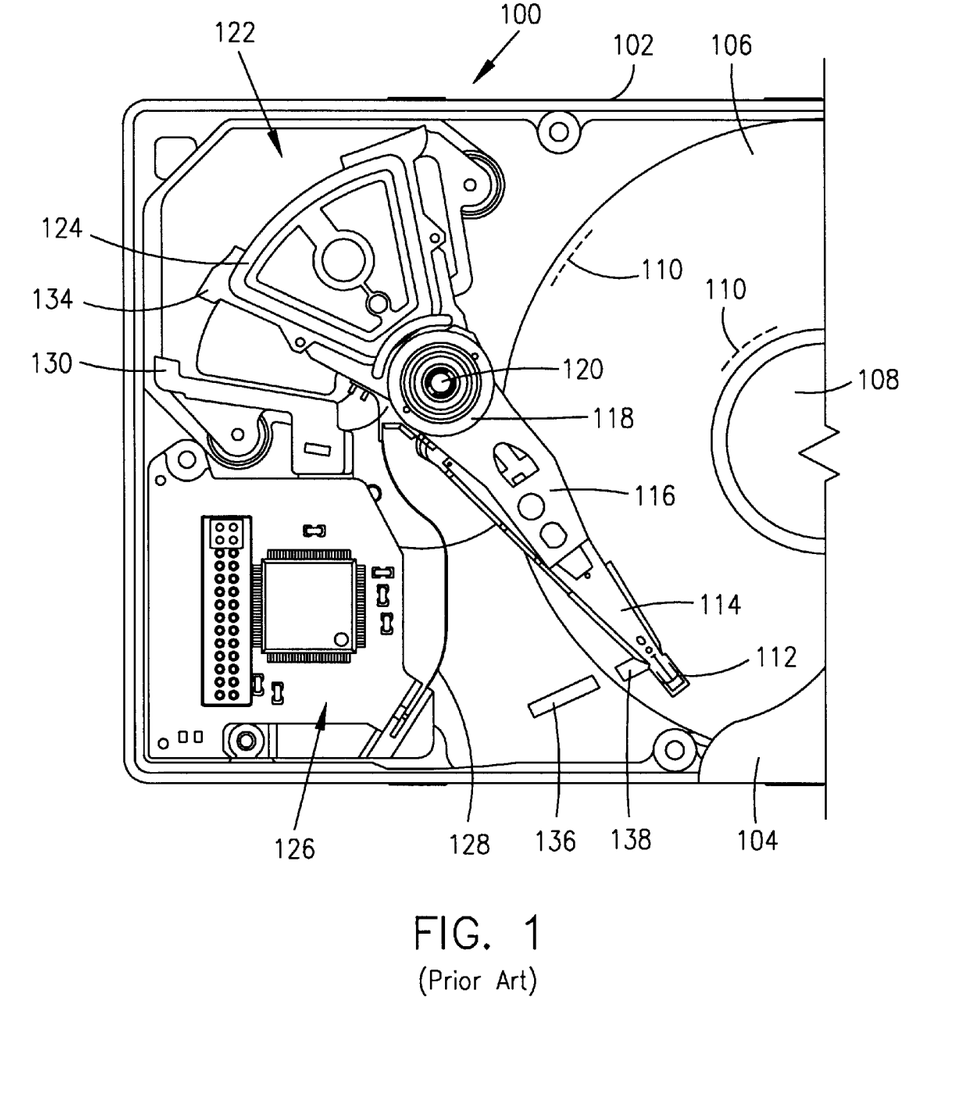
FIG. 1 is a partial plan view in partial cutaway of a disc drive in which the present invention is particularly useful.

Turning now to the drawings and specifically to FIG. 1, shown is a partial plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil 124 which is supported by the actuator bearing housing 118 within the magnetic field of an array of permanent magnets (not separately designated) which are fixedly mounted to the base member 102, all in a manner well known in the industry. Electronic circuitry (partially shown at 126, generally, and partially carried on a printed circuit board (not shown)) to control all aspects of the operation of the disc drive 100 is provided, with control signals to drive the VCM 122, as well as data signals to and from the heads 112, carried between the electronic circuitry 126 and the moving actuator assembly via a flexible printed circuit cable (PCC) 128.

The disc drive 100 also includes an arrangement of components for limiting the range of motion of the actuator. Specifically, the disc drive includes an inner limit stop 130. The inner limit stop 130 cooperates with a contact feature 134 integral to the coil 124 to define the innermost extent to which the actuator mechanism can move the heads 112.

The disc drive also includes an array of ramps 136 which cooperate with ramp contact features, one of which is shown at 138. As can be seen, the ramp contact feature is a part of the flexure 114 which supports the heads 112. The disc drive 100 of FIG. 1 is of the type which utilizes the ramps 136 and ramp contact features 138 to remove the heads 112 from cooperative engagement with the discs 106 when a loss of power is detected. The operation of the ramps 136 and ramp contact features 138, as well as the operation of a latching mechanism used to maintain the heads on the ramps, will be discussed in more detail below. However, it can be noted from the figure that the heads 112 are longitudinally offset from the ramp contact features 138 of the flexures 114. In the case of the configuration shown in FIG. 1, the heads are further from the pivot shaft 120 than the ramp contact features 138. Because of this longitudinal offset, the heads 112 themselves will not contact the ramps 136, and all head lifting is accomplished only by contact between the ramps 136 and the ramp contact features 138. This is necessary to prevent damage to the delicate gimbal components that mount the slider of the head and allow roll and pitch compliance.

Figure 11:
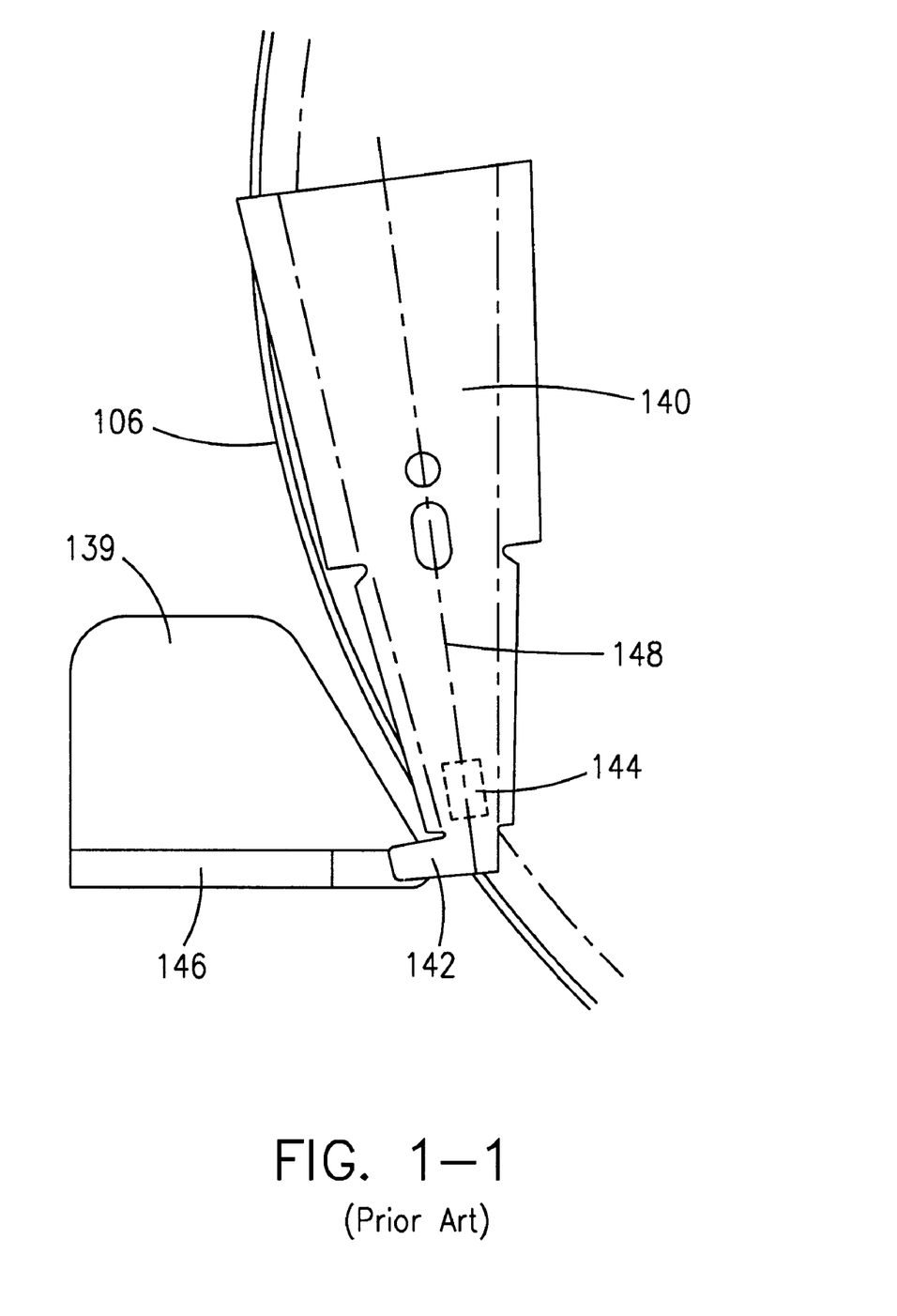

FIG. 1-1 shows an alternative configuration of head suspension or flexure 140. With this flexure 140, the ramp contact feature 142 is located at the far distal end of the flexure 140, while the head 144 is supported by a gimbal apparatus (not shown) at a position between the ramp contact feature 142 and the pivot center of the actuator. An examination of FIG. 1-1 reveals that the ramps 146 which interact with the ramp contact features 142 are mounted closely adjacent the outer diameter of the discs 106, and that the ramp contact features 142 are again offset from the heads 144 along the longitudinal axis 148 of the flexures 140, although in the opposite direction from the configuration of FIG. 1. FIG. 1-1 also shows that the ramps 146 are integrally formed with head protection surfaces 139. These head protection surfaces 139 are substantially coplanar with the discs 106 and, as such will lie between facing heads 144 when the flexure ramp contact features 142 have contacted and moved onto the ramps 146. In this location, the head protection surfaces 139 prevent contact between facing heads 144 that might cause damage to the heads 144. More discussion of the head protection surfaces 139 will be found in the following discussion.

Figure 21:
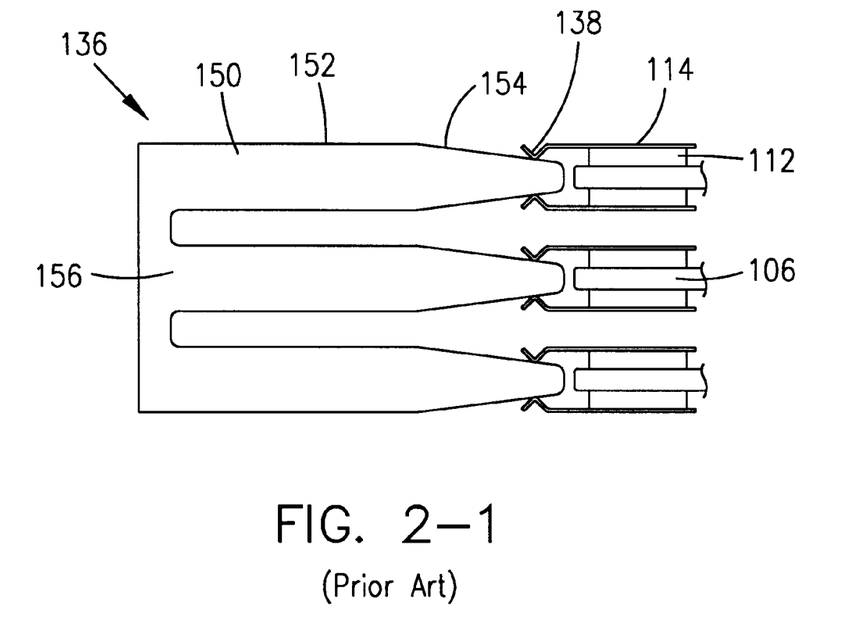

FIG. 2-1 is a simplified elevation view showing the relevant components of a disc drive and a prior art ramp system for unloading and loading the heads. FIG. 2-1 shows the outermost portion of three discs, one of which is designated 106, and six heads, one of which is designated 112, cooperatively engaged with the surfaces of the discs 106. The heads 112 are mounted to and supported by flexures, one of which is designated 114, and the flexures can be seen to each include a ramp contact feature 138 extending laterally from the flexures 114. The person of skill in the art will realize that the specific number of discs 106 and heads 112 in the figures is selected for purposes of illustration only in this and all subsequent discussion, and thus should not be considered as limiting to the scope of the invention.

FIG. 2-1 also shows a ramp structure 136 such as that shown in FIG. 1. The ramp structure 136 can be seen to be made up of a plurality of ramp fingers 150, each of which serves to interact with a pair of facing ramp contact features 138, and each side of which includes a flat portion 152 and a beveled portion 154. The left ends of the ramp fingers 150 are joined by a backing member 156 in a comb-like manner, while the right ends of the ramp fingers 150 each lie opposite a disc 106.

FIG. 2-1 shows the component relationship that exists when the actuator has moved the heads 112 outward to the point where contact between the flexure ramp contact features 138 and the beveled portion 154 of the ramp fingers 150 is first made. The heads 112 are shown in their operational relationship to the discs 106, flying on an air bearing (not visible at the scale of the drawing) above the disc surfaces.

Figure 22:
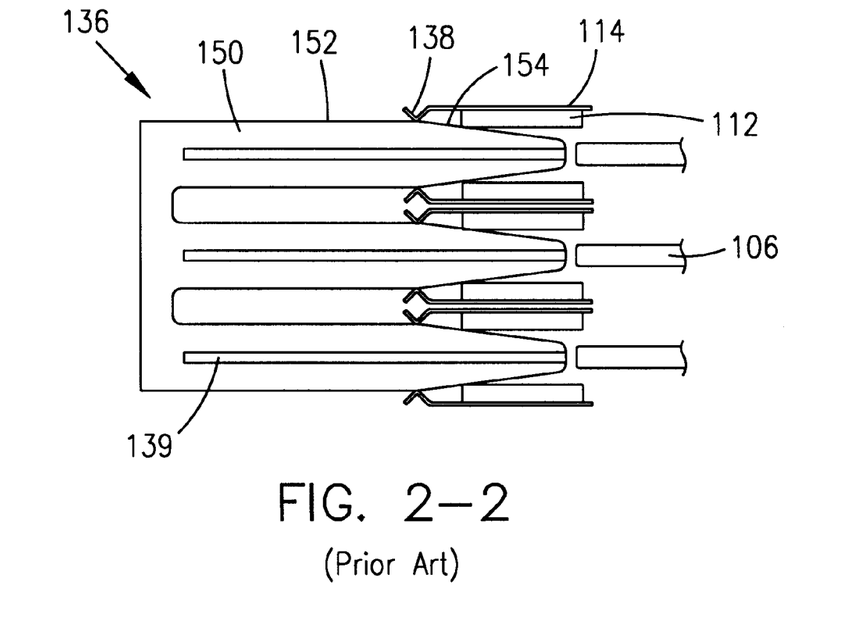

FIG. 2-2 shows a similar prior art ramping system, and represents the component relationship that exists as the actuator continues to move the flexures 114 and heads 112 outward from the outer diameter of the discs 106. Specifically, FIG. 2-2 shows that the heads have been moved outward until the flexure ramp contact features 138 have reached the juncture of the beveled portions 154 and flat portions 152 of the ramp fingers 150. A comparison of FIG. 2-1 to FIG. 2-2 clearly shows that, as the actuator moves the heads 112 outward, the beveled portions 154 of the ramp fingers 150 serve to lift the heads away from the plane of the disc surfaces. In this manner, the heads 112 are moved away from the discs 106 in both the vertical and horizontal axes of the figure. If it is recalled that this ramp unloading of the heads is typically performed in response to the detection of power loss, it is apparent that such ramp unloading of the heads will prevent any contact between the heads and discs as the discs decelerate to a stop.

FIG. 2-2 also shows the presence of head protection surfaces 139, one of which extends toward the viewer from the lateral surface of each ramp finger 150. The head/flexure configuration in the figure is assumed to be similar to that of FIG. 1, i.e., the heads 112 are located farther from the pivot point of the actuator than the flexure ramp contact features 138, and thus closer to the viewer in the figure. It is also evident from the figure that, as the heads 114 and flexures 114 are moved outward and up the beveled portions 154 of the ramp fingers 150, the heads 106 whose operational surfaces face each other will be separated by one of the head protection surfaces. It is known to those of skill in the art that the heads 106, unsupported by an air bearing, will be free to move to a relatively large extent as a result of applied mechanical shocks when parked on the ramp, and it is also known that uncontrolled contact between facing heads can cause damage to one or the other of the contacting heads, or both. The head protection surfaces 139 are typically formed of the same material as the other ramp elements, and this material is typically a plastic, polymer resin or "hard" elastomer, all of which are significantly softer than the calcium titanate, or other very hard, brittle material, from which the sliders of typical heads are formed. Therefore, the head protection surfaces of the figure serve not only to prevent head-to-head contact, but also provide a relatively soft surface for head contact as a result of applied mechanical shocks.

Figure 23:
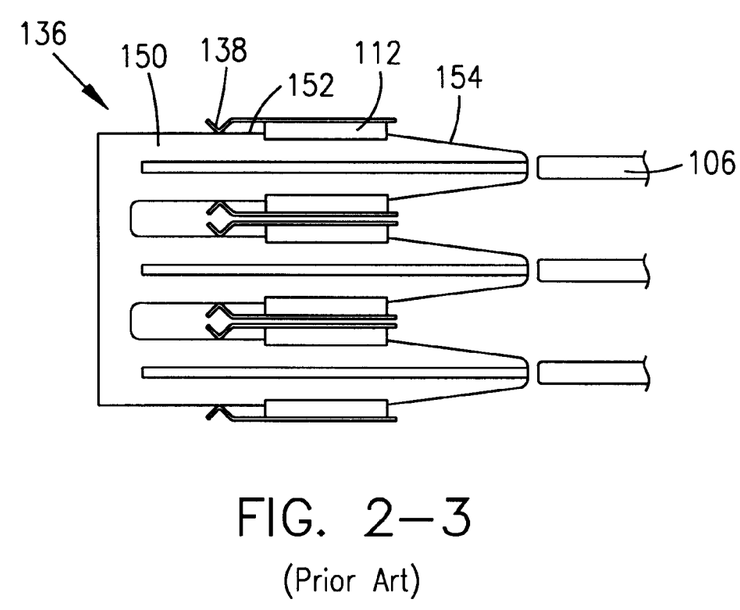

FIG. 2-3 shows a ramping system similar to that of FIG. 2-1 and FIG. 2-2, and illustrates the component relationships when the actuator has moved the heads 112 further outward from the discs 106. In moving from the position of FIG. 2-2 to the position of FIG. 2-3, the heads 112 and flexures maintain the same vertical relationship, since the flexure ramp contact features are moving along the parallel flat portions 152 of the ramp fingers 150. Prior art disc drives have typically utilized such ranges of linear parallel motion of the actuator components to provide motion necessary to engage some sort of actuator latch used to hold the actuator at a park position.

Figure 24:
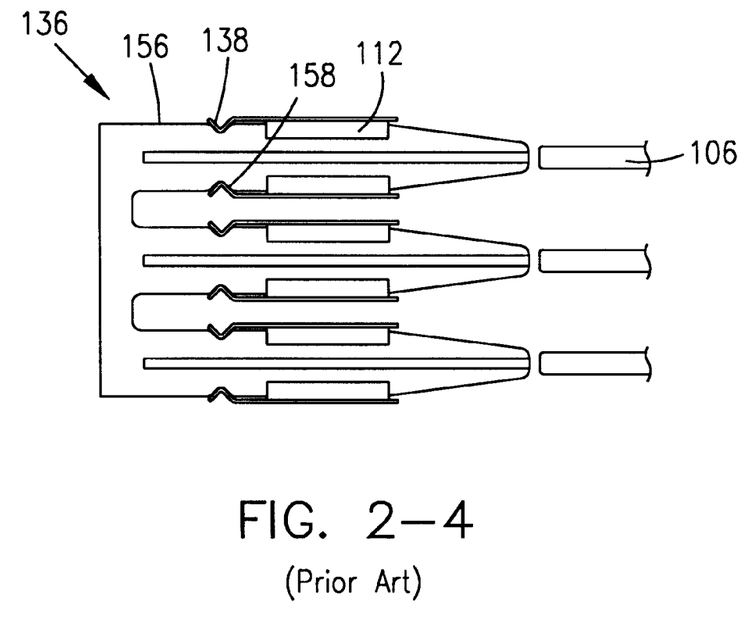

FIG. 2-4 shows a common prior art actuator latching scheme that is incorporated in disc drives using head unloading ramps. In FIG. 2-4, it can be seen that the flat portions 156 of the ramp fingers 150 have been modified to include indentations or detents 158 at some point along their lengths. As the actuator moves outward, the flexure ramp contact features 138 encounter these detents 158 and the load force of the flexures 114, which acts to encourage the heads 112 toward the disc surfaces, causes the flexure ramp contact features 138 to engage the detents 158, as shown. Such detent actuator latching systems have been use quite frequently in the art since the only modification needed is the inclusion of the detents 158.

A careful analysis of FIG. 2-4, however, will reveal that such detent latching schemes are usually unsatisfactory compromises between the amount of latching force available to hold the actuator against movement as a result of applied mechanical shocks and the amount of force necessary to move the actuator away from the detents when power is restored. The figure shows the flexure ramp contact features 138 as having angled faces, and the detents 158 are also shown to have angled faces. While angling the contact surfaces of the flexure ramp contact features 138 and the detents 158 facilitates the unlatching of the actuator, it also serves to make the latch easier to unintentionally unlatch due to applied mechanical shocks. Furthermore, if the contact surfaces were to be made more vertical, the latch would be more resistant to unintended unlatching, but more difficult to unlatch. Indeed, if the latching contact surfaces were truly perpendicular to the flat portion 154 of the ramp fingers 150, it would be impossible to unlatch the actuator without providing some additional apparatus to lift the flexure vertically, thus adding cost and complexity to the disc drive. The present invention provides a vertical latching contact surface to maximize the latching force applied to the actuator, and then makes use of available force applied by the actuator motor to move the flexure latch contact surface away from the vertical latch face during unlatching operations.

Figure 31:
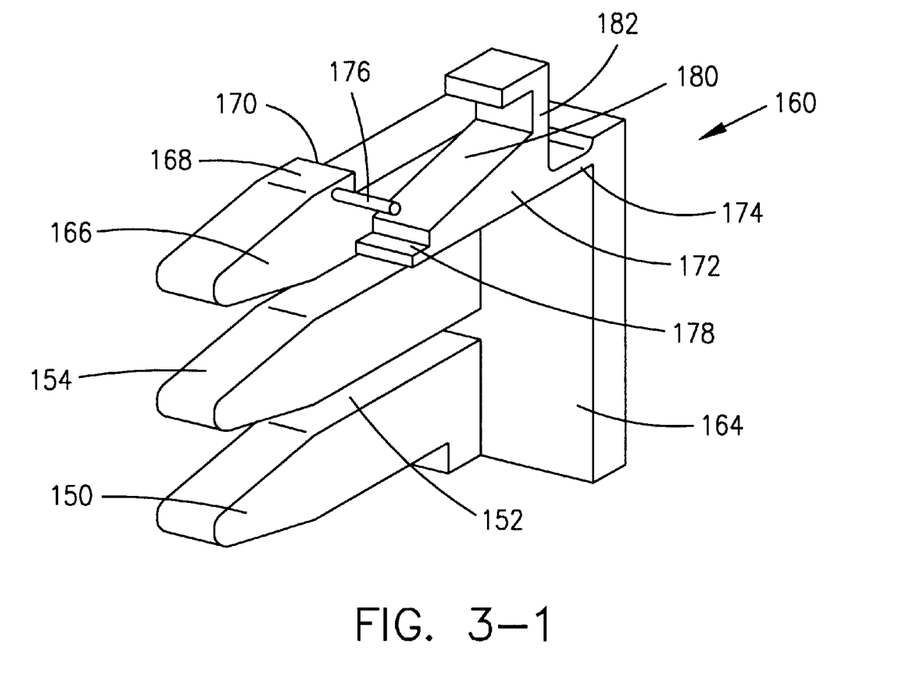
Figure 32:
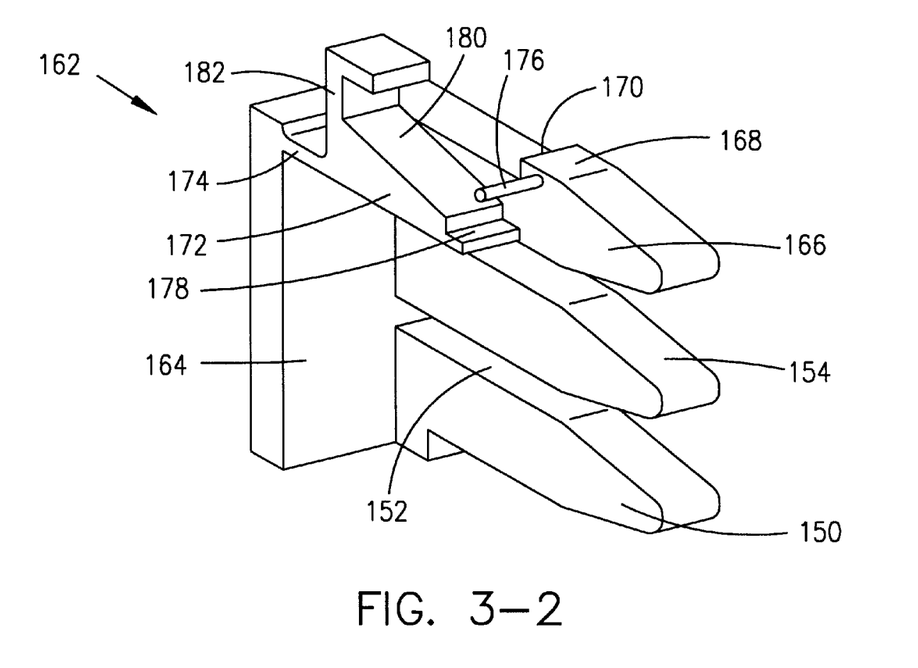

Turning now to FIGS. 3-1 and 3-2, shown are two versions of a ramp structure 160, 162 which form a part of the ramp and latching system of the present invention. The two versions of ramp structure 160, 162 differ only in the type of flexure with which they are intended to be used. Specifically, the ramp structure 160 of FIG. 3-1 is intended for use with a flexure configuration similar to that shown in FIG. 1, that is, a flexure configuration in which the flexure ramp contact feature (138 in FIG. 1) lies between the head (112 in FIG. 1) and the actuator pivot point, while the ramp structure 162 of FIG. 32 is intended for use with flexure configurations similar to that of FIG. 1-1, or flexures which mount the head (144 in FIG. 1-1) between the flexure ramp contact feature (142 in FIG. 1-1) and the actuator pivot point. Thus the following discussion will refer to similarly numbered features in both FIG. 3-1 and FIG. 3-2.

The ramp structures 160, 162 of FIG. 3-1 and FIG. 3-2 include a backing member 164 from which a number of ramp fingers 150, 166 are cantilevered. The ramp fingers 150 are similar to those described above in relationship to FIG. 2-1 through FIG. 2-4, i.e., they include beveled portions 154 and flat portions 152, intended for interaction with flexure contact features (138, 142 in FIG. 1 and FIG. 1-1, respectively) in the manner described above for the prior art.

The topmost ramp finger 166 also includes beveled portions 154, and, on its lower side, a flat portion 152 of similar function to the prior art. It is on the upper side of the ramp finger 166 that differences associated with the present invention occur. Examination of FIG. 3-1 and FIG. 3-2 reveals that the upper side of ramp finger 166 includes a shortened flat portion 168 which is terminated by a discontinuity or vertical latching surface 170. The manner in which the latching surface 170 is used to latch the actuator will be discussed in more detail below. From the figures, it can be seen that the structure of the upper side of the ramp finger 166 then extends in parallel with the flat portions 154, 168 of the ramp fingers 150, 166 from the base of the latching surface 170 to the backing member 164.

The ramp structures 160, 162 also include a pivoting member 172. This pivoting member 172 is connected to the backing member 164 by a thin, flexible hinge element 174. The pivoting member 172 is shown in the figures in its quiescent position and is free to pivot relative to the backing member 164 and the ramp fingers 150, 166 at the flexible hinge element 174. The allowed range of motion of the pivoting member 172 in the upward direction is limited by an upward contact pin 176 extending from the lateral surface of the top ramp finger 166 and a pivot contact feature 178. A similar downward contact pin (hidden from view in FIG. 3-1 and FIG. 3-2) will be shown in other figures and limits the downward rotation of the pivoting member 172 to the quiescent position shown.

The pivoting member 172 also includes a pivoting ramp surface 180 and an unlatching contact feature 182. The operation of the pivoting member 172 and its interaction with other system elements will be discussed in detail below.

FIG. 4-1 shows a first configuration of a ramp contact/latching feature 184 that is another element of the ramp and latching system of the present invention. A person of skill in the art will appreciate that the ramp contact/latching feature 184 can be incorporated in the flexure at either the location shown at 138 in FIG. 1 or at the location shown at 142 in FIG. 1-1. The ramp contact/latching feature 184 is shown as an integral portion of the flexure (114 in FIG. 1, 140 in FIG. 1-1), and includes a beam portion 186 extending laterally from the flexure. At the distal end of the beam portion 186, the ramp contact/latching feature 184 is formed to provide specific elements critical to the present invention. In particular, the ramp contact/latching feature 184 can be seen to include a vertical latching face 188 extending downward from the distal end of the beam portion 186 and a cylindrical contact element 190 continuing from the lowermost end of the vertical latching face 188. The latching face 188 and cylindrical contact element 190 interact with certain features and elements of the ramp structure (160, 162 in FIG. 3-1 and FIG. 3-2, respectively) in a manner to be discussed below to implement the present invention.

FIG. 4-2 shows a second configuration of a ramp contact/ latching feature 184a. This alternative configuration also includes a beam portion 186 integral to and extending laterally from the head supporting flexure 114/144 as in FIG. 4-1. The distal end of the beam portion 186 is formed into a cylindrical support portion 190a which is used to support a pin element 189 which is cantilevered from the support portion 190a. The direction in which the pin element extends from the support portion will be dependent on the type of flexure/head configuration with which it is used, i.e., the configuration of FIG. 1 or the configuration of FIG. 1-1.

Figure 41:
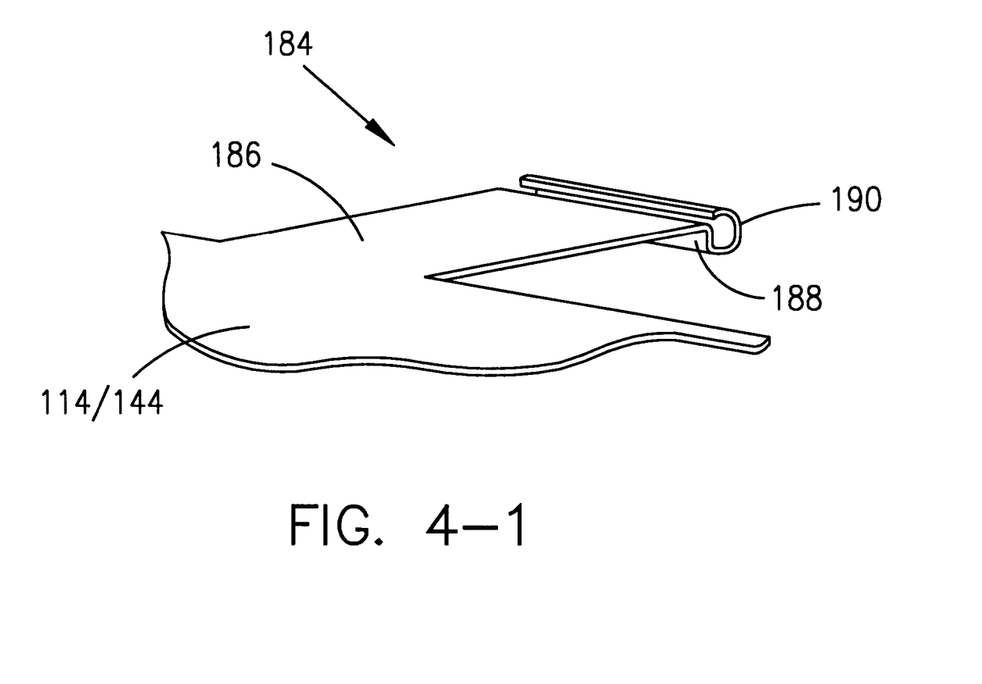
Figure 42:
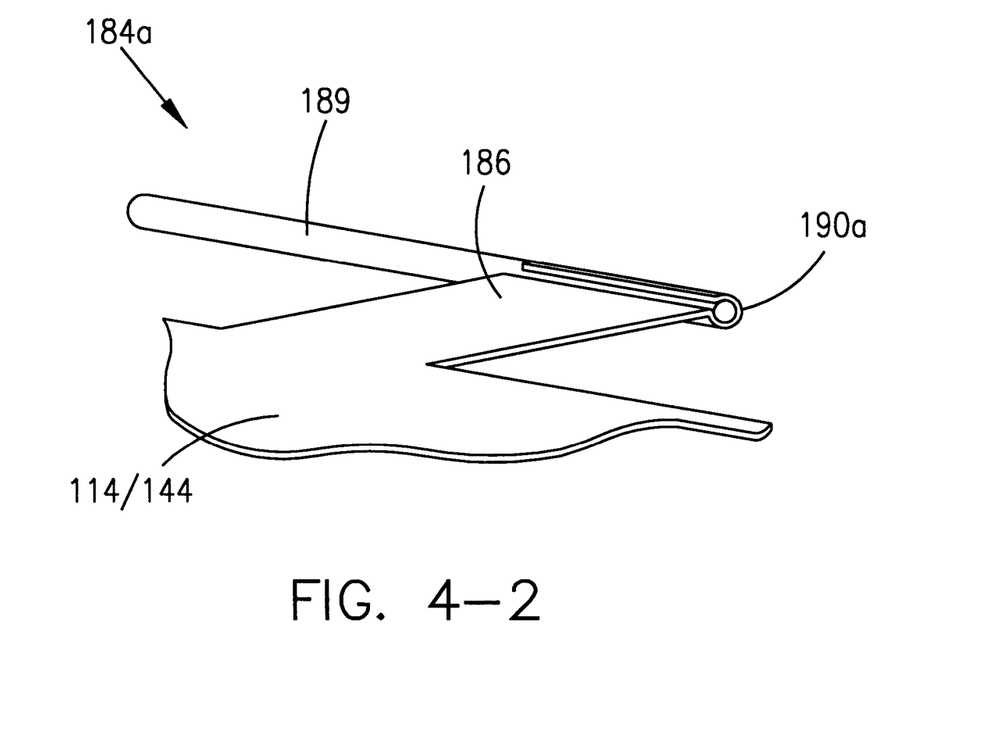

In the alternative configuration of ramp contact/latching feature 184a of FIG. 4-2, actual contact between the ramp structure and the flexure will occur at the pin element 189, as will be appreciated by one of skill in the art. Subsequent discussions of the operation of the present invention will be directed to the configuration of ramp contact/latching feature 184 of FIG. 4-1, but a person of skill in the art will understand that such discussions are also applicable to the configuration of ramp contact/latching feature 184a of FIG. 4-2.

Turning now to FIG. 5-1 through FIG. 5-4, shown are simplified elevation views of the relevant components of a disc drive that incorporates the ramp and latching system of the present invention. FIG. 5-1 through FIG. 5-4 illustrate, in turn, the component relationships involved in the steps of unloading the heads from the discs, latching the actuator, unlatching the actuator, and preparing to reload the heads back onto the discs, respectively.

FIG. 5-1 shows a ramp structure 162 similar to that described above in relationship to FIG. 3-2, the outermost portions of three discs 106, and six heads 112. The five lower heads 112 can be seen to be supported on flexures including typical prior art ramp contact features 138 and will interact with elements of the ramp structure 162 in the manner described above in relationship to FIG. 2-1 through FIG. 2-4.

Figure 51:
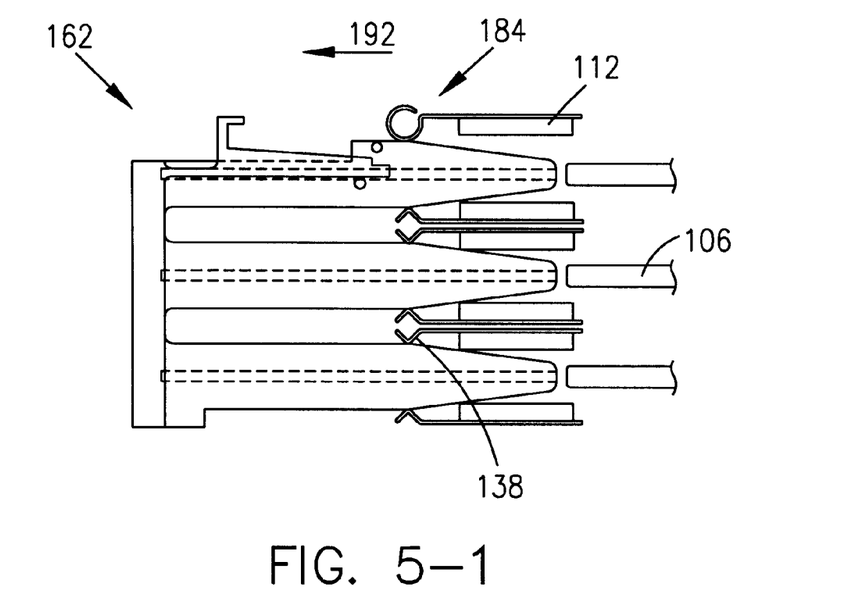

The topmost head in the figures is mounted on and supported by a flexure which includes the ramp contact/ latching feature 184 of FIG. 4-1. FIG. 5-1 shows the position of components when the actuator has moved the heads 112 outward (in the direction of arrow 192) and shows that the heads 112 have been lifted vertically away from the surfaces of the discs 106 as the ramp contact features 138 and ramp contact/latching feature 184 travel in contact with the beveled portions of the ramp fingers up to the flat portions of the ramp fingers.

Figure 52:
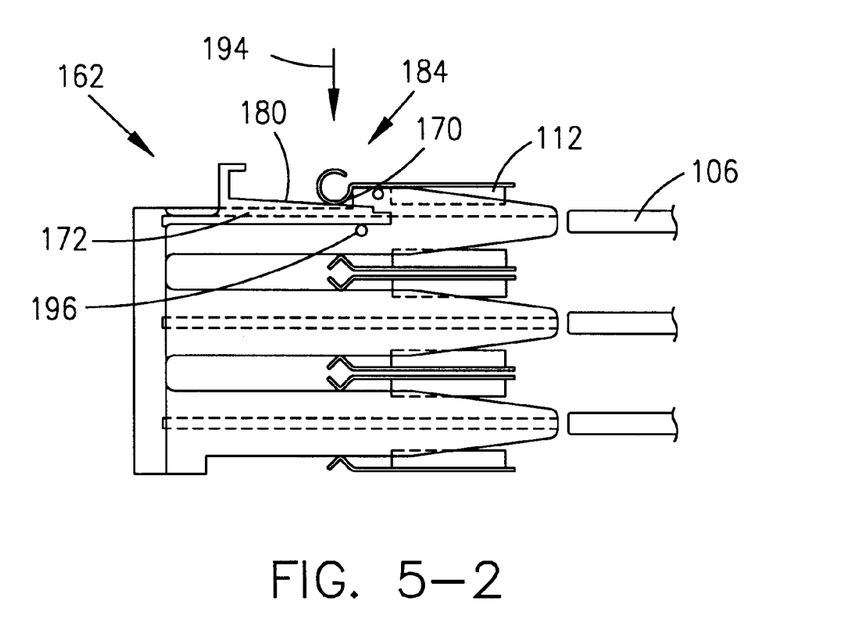
Figure 53:
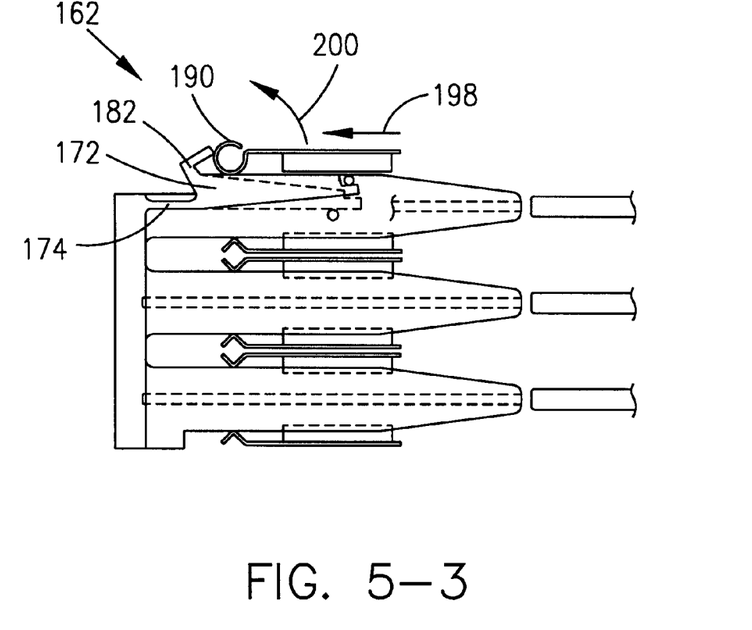

FIG. 5-2 shows that, as the actuator continues to move the heads outward, the ramp contact/latching feature 184 reaches the latching face 170 of the top ramp finger, and the flexure load pressure causes the ramp contact/latching feature 184 to drop down, in the direction of arrow 194, into its latched position. In the latched position, the vertical latching face (188 in FIG. 4) of the ramp contact/latching feature 184 is in contact with the latching face 170 of the top ramp finger, thus effectively preventing motion of the actuator back toward the discs 106. It should also be noted that the cylindrical contact element (190 in FIG. 4) of the ramp contact/latching feature 184 rests on the pivoting ramp surface 180 of the pivoting member 172, and the beam portion (186 in FIG. 4) rests on the flat portion (168 in FIG. 3-2) of the top ramp finger. Such contacts, however, are not critical to the latching function of the present invention, and a person of skill in the art will appreciate that the significant latching contact is that between the vertical latching faces (188 in FIG. 4, 170 in FIG. 3-2).

It can also be seen in FIG. 5-2 that any tendency of the pivoting member 172 to rotate clockwise as a result of contact with the ramp contact/latching feature 184 is prevented by contact between the lower surface of the pivoting member 172 and a downward contact pin 196 extending from the top ramp finger in a manner similar to that shown for the upward contact pin in the description of FIG. 3-1 and FIG. 3-2 above.

It should be restated at this point that the latching function of the present invention typically operates as a result of the detection of a power loss to the disc drive, and, as such, occurs only as a result of the actuator being driven outward using the back emf of the spindle motor power. Thus the latching operation is totally passive and requires only this actuator motion to operate.

Figures 1, 53:
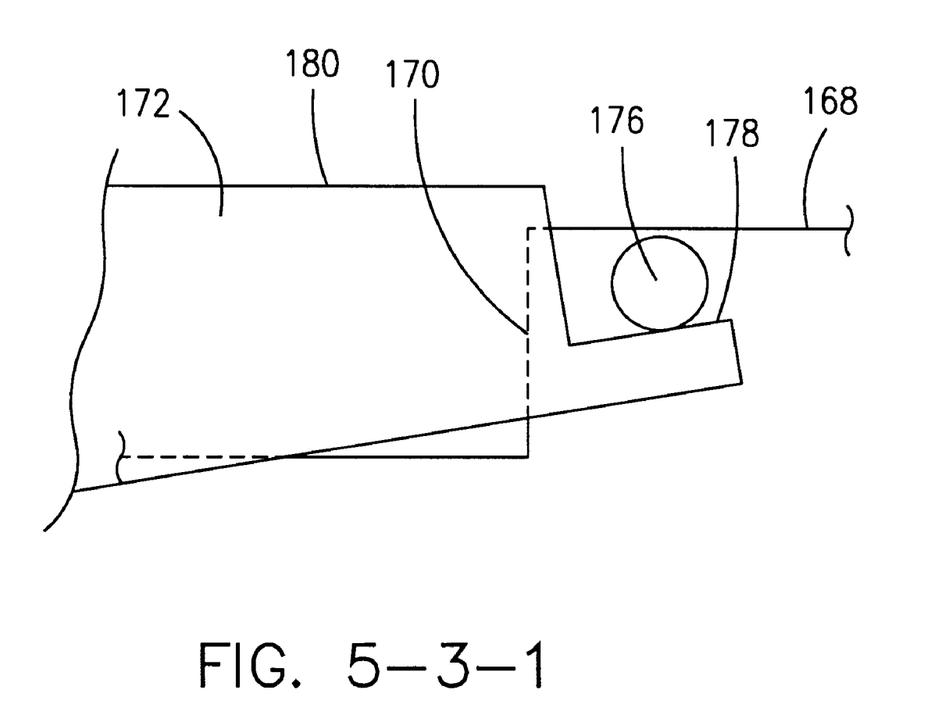

FIG. 5-3 illustrates component motion and relationships which provide the unlatching function of the present invention. Since unlatching of the actuator will only occur upon restoration of power to the actuator, all events described subsequently will be under control of the disc drive electronic control circuitry, in manner well known in the industry.

In disc drives incorporating head ramps, it is common practice to wait after application of power until the discs have accelerated to a speed sufficient to establish an air bearing for the heads before initiating unlatching of the actuator and reloading the heads into their operating relationship to the discs. Thus, in disc drives incorporating the present invention, once other disc drive actions necessary to overall operations have been completed, the internal power up programming of the disc drive initiates the unlatch sequence.

As shown in FIG. 5-3, in the first operation of the unlatching sequence, the actuator is driven outward along the pivoting ramp surface 180 in the direction of arrow 198. This results in contact between the cylindrical contact element 190 of the ramp contact/latching feature 184 and the unlatching contact feature 182 of the pivoting member 172. As the actuator continues to be driven outward the flexible hinge element 174 is bent and the pivoting member is rotated counterclockwise, as shown by arrow 200, until contact is made between the upward contact pin and the pivot contact feature (176, 178 in FIG. 3-2, respectively). When this limit to rotation is reached, the pivoting ramp surface 180 is lifted to a position in which it is at an angle slightly above the flat portion 168 of the top ramp finger 166. This relationship is shown in detail in FIG. 5-3-1.

FIG. 5-3-1 shows a portion of the pivoting member 172 in the position to which it would be driven for unlatching operation. From the figure, it is clear that the pivoting ramp surface 180 is slightly above the flat portion 168 of the ramp, and that the amount of non-coplanarity of these surfaces is determined by the contact between the upward limit pin 176 and the pivot contact feature 178. Bringing the pivoting ramp surface 180 into this relationship with the flat portion 168 of the ramp structure is necessary because, once the actuator begins to move the heads toward the discs, the force applied by the actuator to rotate the pivoting member 172 (as shown in FIG. 5-3) is removed, and the pivoting member 172 begins to return to its rest position under influence of the load force of the flexure exerted on the pivoting ramp surface 180 and the stress induced in the flexible hinge element 174 during the rotation of the pivoting member 172. Thus, the extent to which the pivoting ramp surface 180 rises above the flat portion 168 will be determined as a function of the material of the ramp structure 162, the dimensions of the flexible hinge element 174 and the load force exerted by the flexure against the pivoting ramp surface 180, all selected based on how quickly the actuator can move the heads from the unlatch position of FIG. 5-3 to a position wherein the ramp contact/latching feature 184 is located inward of the latching face 170 of the ramp structure.

In practice, the rotation of the pivoting member 172 back to its rest position (as shown in FIG. 5-1 and FIG. 5-2) is envisioned as a damped motion. That is, the entire ramp structure 162 is envisioned as manufactured from a plastic or polymer. Such materials are known to be relatively slow in returning from a deformed state to an undeformed state. Thus, by selection of the material of the ramp structure 162 and selection of the dimensions of the flexible hinge element 174, the speed at which the pivoting member 172 rotates back to its rest position can be determined, and, in the present invention, this rotation speed is envisioned to be such that the rotation of the pivoting ramp surface 180 to a position below the top of the latching face 170 of the ramp structure 162 will require several milliseconds. The actuator of a typical disc drive in which the present invention can be implemented is capable of moving the ramp contact/latching feature 184 from the position of FIG. 5-3 to a position inward of the latching face 170 in approximately two milliseconds, including the time to accelerate the actuator and bring it to either rest or low velocity with the ramp contact/latching feature 184 in a position to controllably reload the heads onto the surfaces of the discs.

Figure 54:
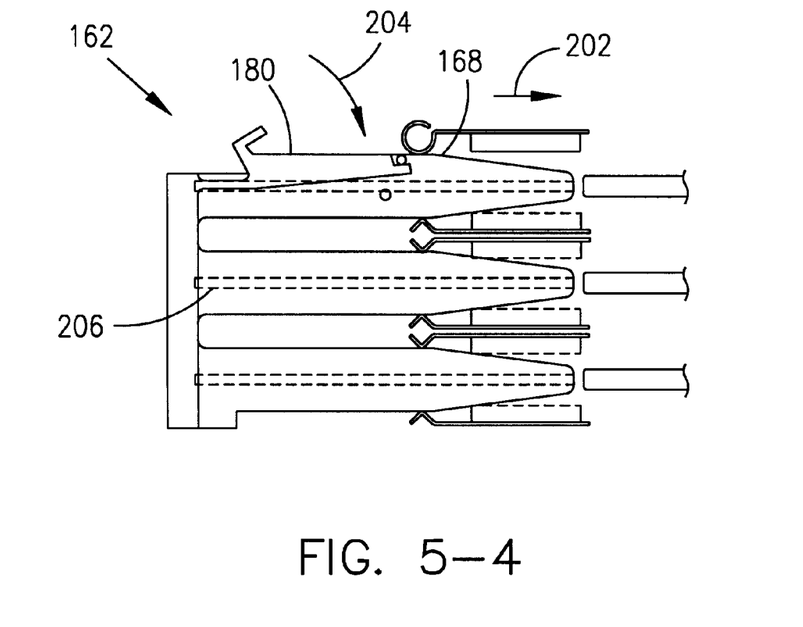
Figure 61:
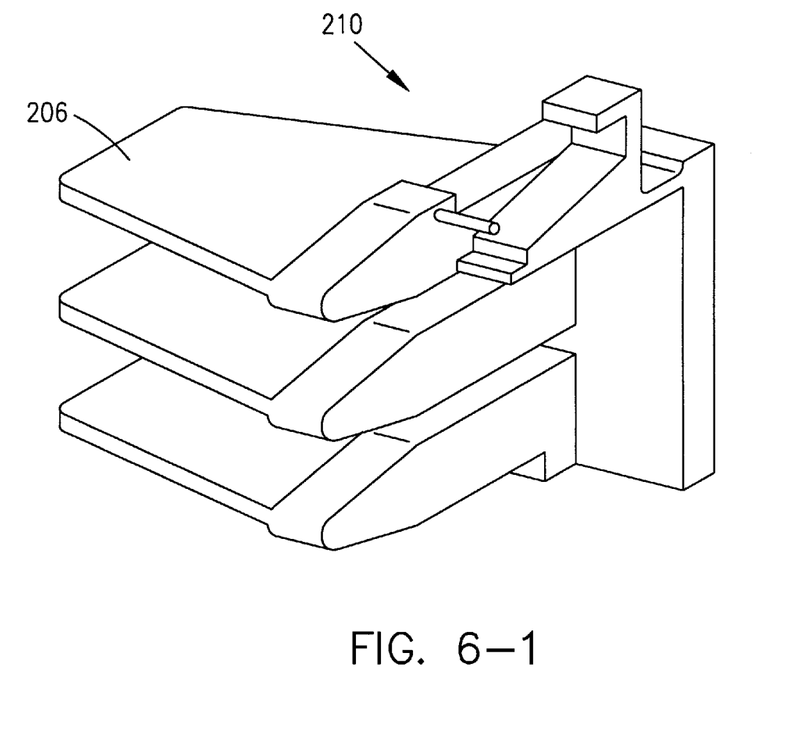
Figure 62:
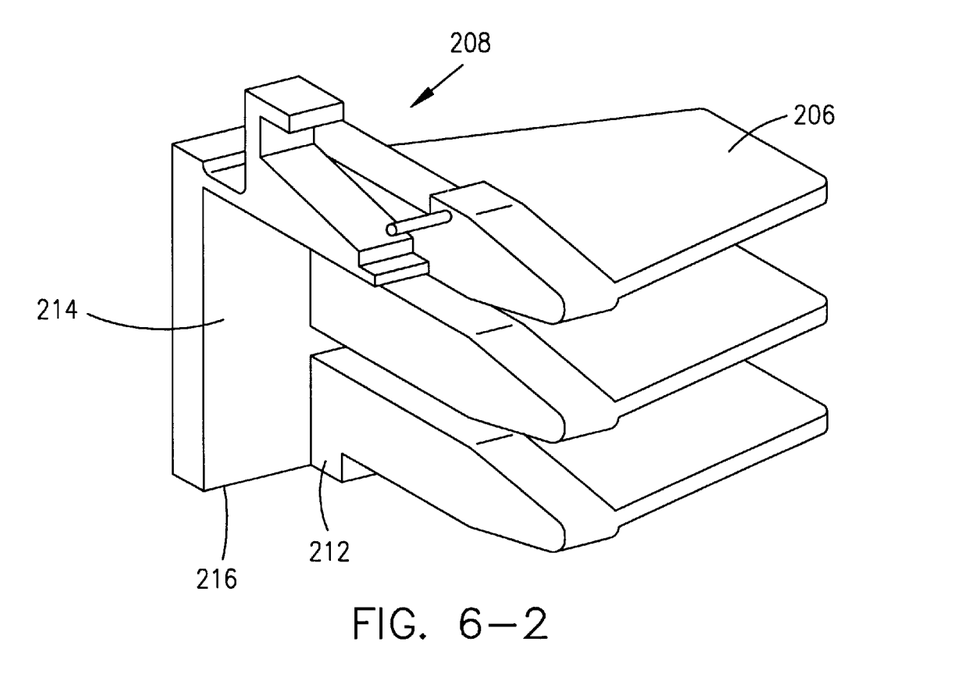

FIG. 5-4 illustrates the actuator motion that must occur to complete the unlatching action of the present invention. In the figure, it can be seen that the actuator has driven the heads inward in the direction of arrow 202 and to a position where the cylindrical contact element 190 rests on the flat portion 168 of the ramp structure. Again, this movement must occur before the pivoting ramp surface 180 can rotate in the direction of arrow 204 to a position below the top of the latching face 170. From the actuator position shown in FIG. 5-4, the heads 112 can be moved down the beveled portion 154 of the ramps and into their operative relationship with the discs 106 in a manner consistent with the prior art.

Additional optional features of the ramp system are also shown in FIG. 5-1 through FIG. 5-4. For instance, the figures show head protection surfaces, represented by dotted lines designated 206 in FIG. 5-4, extending from the lateral surfaces of the ramp fingers between facing pairs of heads 112, as was discussed in relationship to the prior art FIG. 2-2 through 2-4. Since the pivoting member 172 in FIG. 5-1 through FIG. 5-4 is shown on the near side of the ramp fingers, and since it is desirable to have the heads 112 located in close proximity to the ramp contact features of the flexures, the heads 112, as shown in FIG. 5-1 through FIG. 5-4, are on the far side of the ramp structure. Such relationships are consistent with flexure configurations such as that of FIG. 1-1.

A ramp structure 208, such as that shown in FIG. 5-1 through FIG. 5-4, incorporating the optional head protection surfaces 206 is shown in FIG. 6-2, while FIG. 6-1 shows a similar ramp structure 210 useful with flexure configurations such as that of FIG. 1.

Further examination of FIG. 6-2 reveals that the rearmost portion of the lowermost ramp finger includes a step-down 212 which extends rearward to define the lower extent of the backing member 214. Similar step-downs are also shown in FIG. 3-1 and FIG. 3-2, FIG. 5-1 through FIG. 5-4 and in FIG. 6-1. This step-down 212 is included to provide spacing for the lowermost head/flexure assembly, and it will be readily recognized that such spacing could alternatively be provided by a relief feature in the disc drive housing base member.

It is presently envisioned that the ramp structure of the present invention will be mounted in the disc drive by an adhesive applied to the lower surface 216 of the backing member and bonding the ramp structure to the housing base member. However, one of skill in the art will realize that the backing member 214 can be easily modified to incorporate a mounting flange which can be attached to the housing base member using machine screws or other similar fasteners.

Figure 7:
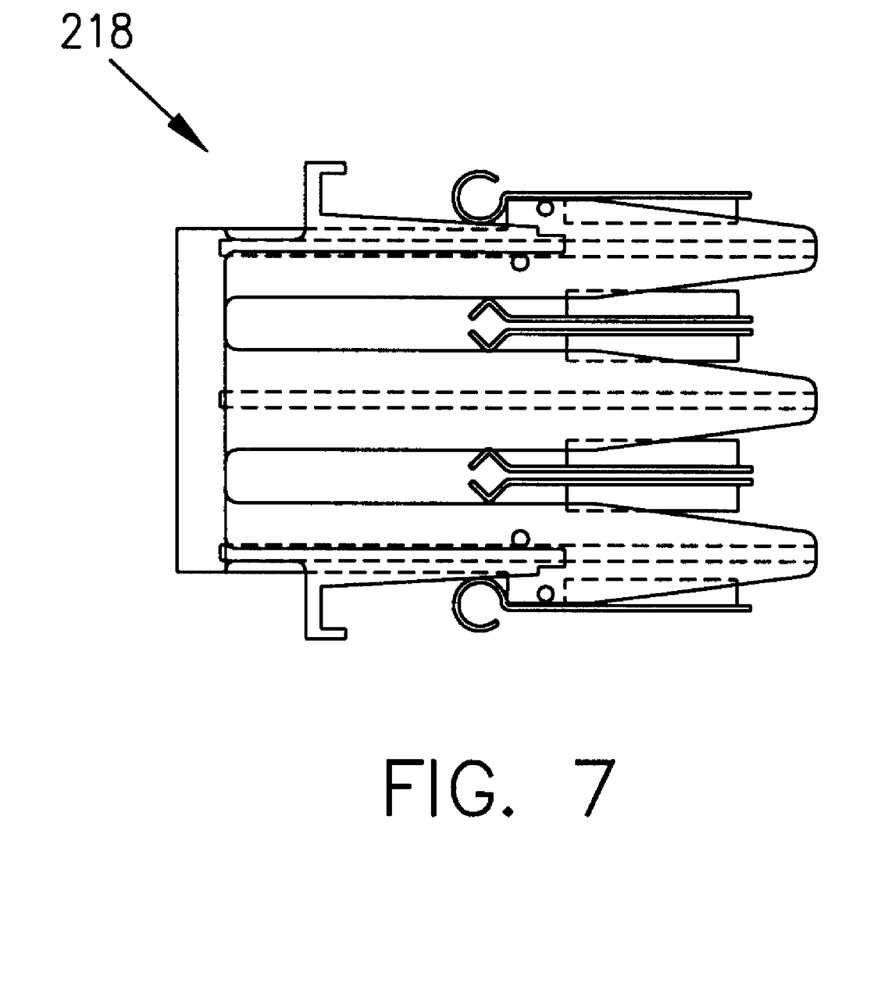
FIG. 7 is a simplified elevation view of an alternative embodiment of the ramp and latching system of the present invention.

FIG. 7 shows an alternative embodiment of the ramp/latching system of the present invention in which the ramp structure 218 includes the latching and unlatching features described on both the top and bottom ramp fingers. Such a structure would provide substantially double the latching security of the previously described embodiments, should this be desirable in the disc drive in which the present invention is incorporated. It will also be recognized that the ramp/latching system of the present invention could be implemented with the described latching features associated with only the lowermost ramp surfaces.

The person of skill in the art will also realize that the latching mechanism of the present invention could also be implemented in disc drives of the type wherein the heads are parked on the disc surfaces near the inner diameter of the discs. Such a latching system would include a latching feature integral to the actuator coil which has vertical compliance, a single ramp feature having a vertical latching face and a pivoting element similar to that already described to enable unlatching under control of actuator movement.

From the foregoing, it is apparent that the present invention is particularly well suited to achieve the objects and provide the benefits set forth hereinabove as well as others inherent therein. While particular embodiments of the invention have been described herein, modifications to the embodiments which fall within the envisioned scope of the invention may suggest themselves to one of skill in the art who reads this disclosure. Therefore, the scope of the invention should be considered to be limited only by the following claims.

What is claimed is:

1. A ramp and latching system, for unloading heads in a disc drive from engagement with discs having recording surfaces and latching the heads at a park location on ramps, comprising:

a ramp contact/latching feature integral to at least one of a plurality of flexures supporting the heads, the ramp contact/latching feature further comprising a flexure vertical latching face normal to the recording surfaces of the discs and a cylindrical contact feature, a ramp structure comprising a plurality of ramp fingers each including a beveled portion and a flat portion, the flat portion associated with the ramp contact/latching feature further comprising a ramp vertical latching face normal to the recording surfaces of the discs, a pivoting element, associated with the ramp vertical latching face, comprising a pivoting ramp surface and an unlatching contact feature, flexible hinge means for allowing pivoting of the pivoting element relative to the ramp fingers, and pivot limiting means for defining limits to the range of motion of the pivoting element in both a first or latching direction and a second or unlatching direction, wherein latching is accomplished by moving the heads outward from the discs until the flexure vertical latching face engages the ramp vertical latching face at a latched position under influence of flexure load force, and wherein unlatching is accomplished by firstly moving the heads outward from the latched position until contact between the cylindrical contact feature of the ramp contact/latching feature of the flexure and the unlatching feature of the pivoting element causes rotation of the pivoting element in the unlatching direction, bringing the pivoting ramp surface of the pivoting element into substantially coplanar relationship with the flat portion of the ramp finger having the vertical latching face, and secondly moving the heads inward in relation to the discs along the pivoting ramp portion until the ramp contact/latching feature of the flexure passes inward of the ramp vertical latching feature.

\* \* \* \* \*